(12) United States Patent
Dietz, III et al.

(10) Patent No.: US 6,255,420 B1
(45) Date of Patent: Jul. 3, 2001

(54) START-UP PROCESS FOR GAS PHASE PRODUCTION OF POLYBUTADIENE

(75) Inventors: Albert George Dietz, III; Daniel Paul Zilker, both of Charleston; Kiu Hee Lee, South Charleston, all of WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/444,693

(22) Filed: Nov. 22, 1999

(51) Int. Cl.$^7$ ............................. C08F 2/34; C08F 136/06
(52) U.S. Cl. ..................... 526/185; 526/153; 526/164; 526/151; 526/190; 526/340.4; 526/901; 526/912; 526/335
(58) Field of Search ..................... 526/153, 164, 526/185, 186, 190, 340.4, 901, 912, 151, 335

(56) References Cited

U.S. PATENT DOCUMENTS

| | | |
|---|---|---|
| 4,376,191 | 3/1983 | Geck ..................... 526/102 |
| 4,564,660 | 1/1986 | Williams et al. ..................... 526/106 |
| 4,699,960 | 10/1987 | Gordini et al. ..................... 526/81 |
| 5,548,040 | 8/1996 | Cann et al. ..................... 526/62 |
| 5,908,904 | * 6/1999 | Sylvester et al. ..................... 526/153 |
| 6,096,840 | * 8/2000 | Bernier et al. ..................... 526/901 X |

OTHER PUBLICATIONS

Hackh's Chem. Dictionary, 4th ed., McGraw–Hill, N.Y., 27, 1969.*

* cited by examiner

Primary Examiner—Fred Teskin
(74) Attorney, Agent, or Firm—James H. Dickerson, Jr.

(57) ABSTRACT

A process for starting a polymerization of butadiene to produce polybutadiene in a gas phase reactor having a seed bed which comprises (i) passivating the reactor and the seed bed by introducing an aluminum alkyl having a concentration ranging from about 2,000 to 20,000 ppm and (ii) feeding the catalyst and co-catalyst to the reactor before the addition of the butadiene.

8 Claims, No Drawings

START-UP PROCESS FOR GAS PHASE PRODUCTION OF POLYBUTADIENE

FIELD OF THE INVENTION

The invention relates to the production of high cis 1,4-polybutadiene in a gas phase polymerization of 1,3-butadiene. More particularly, the invention relates to a novel process for starting the gas phase polymerization of 1,3-butadiene that reduces or eliminates the induction period for the polymerization, makes the reaction more controllable, and/or reduces overall operation costs.

BACKGROUND OF THE INVENTION

The polymerization of one or more alpha olefins in a gas phase process using Ziegler-Natta catalysts has been practiced commercially for a long time. The polymers produced are considered to be crystalline and are granular, free-flowing and are non-sticky or "dry".

More recently, the polymerization of ethylene-propylene rubbers (EPRs) such as ethylene-propylene-diene (e.g., ethylidene norbornene, ENB) have been successfully produced commercially in a gas phase process using a vanadium catalyst and an inert particulate material (e.g., carbon black) to maintain the bed of forming polymer in the fluidized state. The so-called "sticky" polymers produced are amorphous, but otherwise granular, free-flowing, and non-sticky or appear "dry".

Only most recently, it has been demonstrated that a third class of polymers can be produced by gas phase polymerization processes. However, these polymers have not as yet been produced commercially using a gas phase process. In these gas phase processes, high cis 1,4-polybutadiene can be produced by the gas phase polymerization of 1,3-butadiene using several catalyst systems, preferably in the presence of an inert particulate material such as carbon black and/or silica. See, for example, U.S. Pat. Nos. 4,994,534 and 5,453,471, as well as WO 96/04322 and WO 96/04323. In these processes significant amounts of liquid monomer (butadiene) are present in these gas phase polymerizations. The polymers produced are highly amorphous, granular, free-flowing, appear "wet" (that is they tend to want to clump together over time under certain conditions and develop characteristics of stickiness).

For the gas phase production of polybutadiene on a commercial scale, start-up and passivation procedures presently employed in the production of alpha olefin homo- and copolymers and EPR/EPDMs have not been effective. Such attempts have resulted in an unusually long induction period, difficulty in achieving reactor process control, wasted catalyst and co-catalyst, and an increase in undesirable side-reactions.

Accordingly, there is a need for an improved start-up and passivation process for the gas phase production of polybutadiene.

SUMMARY OF THE INVENTION

There is provided a process for starting a polymerization of butadiene to produce polybutadiene in a gas phase reactor which comprises (i) passivating the reactor and a seed bed by introducing a passivating compound selected from the group consisting of at least one an aluminum alkyl compound a dialkylzinc compound, and mixtures thereof having a concentration ranging from about 2,000 to 20,000 ppm based upon the total amount of polymer employed in the seed bed and (ii) feeding the catalyst and co-catalyst to the reactor before the addition of the butadiene.

DETAILED DESCRIPTION OF THE INVENTION

Commercially, in the gas phase polymerization of homo- and co-polymers of alpha olefins and EPR/EPDMs, a typical start-up for the Unipol™ process and reactor can include in order the following steps: (1) drying the reactor and seed bed; (2) passivating the seed bed; (3) adding the monomer (s); and finally (4) adding the catalyst and co-catalyst with subsequent reaction initiation. During reactor and seed bed preparation, the reactor is typically dried to 10 to 50 ppmv water or less in the reactor. This is followed by the addition of any aluminum alkyl including alkyl aluminum hydrides and chlorides. Preferred aluminum alkyls include, for example, triethylaluminum (TEAL), triisobutyl aluminum, triethylaluminum chloride, dibutylaluminum hydride, and aluminoxane "such as methyl aluminoxane (MAO) and modified methylaluminoxane (MMAO)". to passivate the seed bed by removing remaining water and other impurities. In a most preferred embodiment, the aluminum alkyl employed as the cocatalyst is employed to passivate the reactor and bed. However, when an aluminoxane is used as the cocatalyst typically a different aluminum alkyl is used for passivation because of cost considerations.

After purging the reactor at least once to remove the byproducts of the passivation step, monomer(s) is added to the reactor and increased gradually to normal operating levels and, when desired, inert particulate material is added. Lastly, the catalyst and co-catalyst is fed into the reactor. The onset of polymerization typically occurs within 1 to 3 hours after addition of the catalyst system and is referred to as the induction period.

However, when the above-described start-up and passivation is employed for the reactor system for the polymerization of 1,3-butadiene to form high cis 1,4-polybutadiene, initiating the reaction under controlled conditions was difficult. An induction period of 4 to 7 hours was observed before reaction commenced, despite the feeding of monomer, catalyst, and co-catalyst. When polymerization did begin, it often progressed at a decelerated rate until the rate of reaction approached the monomer feed rate. This delay or induction period caused reactor process control difficulties such as unwanted side reactions and resulted in wasted catalyst and co-catalyst. For example, the 1,3-butadiene underwent dimerization to form 4-vinylcyclohexane (VCH), which poisoned the catalyst, especially at the temperatures used for polymerization (e.g., 50 to 80° C.). Minimizing the time that 1,3-butadiene spends in the reactor at the reaction temperature decreases the amount of dimerization that can occur.

The start-up process of the present invention reduces the induction period, employs less catalyst and co-catalyst, and minimizes or avoids unwanted dimerization.

In the start-up/passivation process of the invention, butadiene is polymerized to produce polybutadiene in a gas phase reactor after the reactor and seed bed have been passivated. This is accomplished by introducing a passivating agent selected from the group consisting of an aluminum alkyl, a dialkyl zinc compound, or mixture thereof, in a concentration ranging from about 2,000 to 20,000 ppm, preferably about 4000–8000 ppm, based upon the total amount of polymer used in the seed bed (that is, the total polymer in the seed bed prior to start-up). Secondly, the catalyst and co-catalyst are fed to the reactor before the addition of the butadiene.

In a preferred start-up/passivation process, the reactor and seed bed is dried such that there remains only about 10 to 50 ppm water. This is followed by the addition of the 2,000 to 20,000 ppm of the aluminum alkyl, the dialkylzinc compound, or a mixture thereof employed in passivation. Then catalyst and co-catalyst is added in sufficient concentration ranging from 25–70 ppm metal for catalyst, preferably 45–60 ppm metal; and ranging from 15000–25000 ppm for aluminum alkyl, preferably 17000–19000 ppm aluminum alkyl. The catalyst and co-catalyst are pre-fed to the reactor before the monomer. The monomer (butadiene) is introduced last.

By passivating with higher levels of aluminum alkyl or dialkylzinc compound and introducing the monomer last to the reactor, the induction period is reduced to about 30 to 60 minutes. That is, 30 to 60 minutes after the monomer is added to the reactor, polymerization commences. The introduction of the catalyst and cocatalyst before adding the monomer additionally ensures that the undesirable dimerization side-reaction is greatly diminished. And since this side-reaction is no longer taking place, the amount of catalyst and co-catalyst employed in the polymerization is decreased, making the overall process more cost effective.

In the invention, the alkyl aluminum used for passivation can be represented by the formula $R_3Al$ wherein each R can be the same or different and is an alkyl radical having 1 to 14 carbon atoms, preferably 2 to 8 carbon atoms. Preferably, the alkyl aluminum used for passivation is the same as that used as the co-catalyst. It has been shown that it is typically necessary to feed less than 2000–20000 ppmw aluminum alkyl (tri-isobutyl aluminum, di-isobutyl aluminum, triethylaluminum, are examples of aluminum alkyls that could be used for passivation) to a dried reactor and seed bed in order to remove any impurities present in the seed bed or in the reactor. The passivating alkyl aluminum is most preferably an aluminoxane or TEAL.

To ensure complete passivation, the mixing time for the aluminum alkyl or dialkylzinc compound should be 1–3 hours. The reactor is then purged at least twice with nitrogen at high pressure (250–500 psig) to remove any by-products resulting from the alkyl passivation.

When passivation is conducted using a dialkylzinc compound, such compounds have the formula $ZnRR'$ wherein each R and R' is the same or different and is an alkyl radical having 1 to 14 carbon atoms, preferably 2 to 8 carbon atoms. Preferably the dialkylzinc compound is diethylzinc.

The invention can be used for the gas phase polymerization of polybutadiene. Gas phase processes employable in the present invention can include so-called "conventional" gas phase processes, "condensed-mode," and, most recent, "liquid-mode" processes. In these processes, it is often desirable to include a scavenger in the reactor to remove adventitious poisons such as water or oxygen before they can lower catalyst activity.

Conventional fluidized processes are disclosed, for example, in U.S. Pat. Nos. 3,922,322; 4,035,560; 4,994,534; and 5,317,036.

Condensed mode polymerizations, including induced condensed mode, are taught, for example, in U.S. Pat. Nos. 4,543,399; 4,588,790; 4,994,534; 5,317,036; 5,352,749; and 5,462,999.

Liquid mode or liquid monomer polymerization mode is described in U.S. Pat. No. 5,453,471; and WO 96/04323 (PCT/US95/09826). For diolefin (e.g., butadiene) polymerization of the invention, it is preferable to use liquid mode and to employ an inert particulate material, a so-called fluidization aid or flow aid.

Inert particulate materials are described, for example, in U.S. Pat. No. 4,994,534 and include carbon black, silica, clay, talc, and mixtures thereof. Organic polymeric materials (e.g., polymers and copolymers of an alpha olefin and polystyrene, in granular or powder form) can also be employed as fluidization aids. EP 0 727,447 and WO 98/34960 also may disclose carbon blacks suitable for use in gas phase processes. Of these, carbon black, silica, and mixtures of them are preferred. When employed as fluidization aids, these inert particulate materials (carbon black, silica, clay, or talc) are used in amounts ranging from about 0.3 to about 80% by weight, preferably about 5 to 60%, most preferably 10 to 45%, based on the weight of the polymer produced. Organic polymeric materials are employed in amounts ranging from 0.3 to 50%, preferably 0.3 to 10% by weight based upon the weight of the final polymer produced.

The fluidization aid can be introduced into the reactor at or near the top of the reactor, at the bottom of the reactor, or to the recycle line directed into the bottom of the reactor. The inert particulate material can also comprise all or a portion of the seed bed upon start-up. Preferably, the fluidization aid is introduced at or near the top of the reactor or above the fluidized bed. It is preferred to treat the fluidization aid prior to entry into the reactor to remove traces of moisture and oxygen. The fluidization aid can be added separately or combined with all or a portion of the butadiene or with a soluble unsupported catalyst. Preferably, the fluidization aid is added separately.

The use of inert particulate materials as fluidization aids in polymer polymerization produces a polymer having a core-shell configuration such as that disclosed in U.S. Pat. No. 5,304,588. The polybutadiene polymer produced with one or more of these fluidization aids typically produces a resin particle comprising an outer shell having a mixture of a polymer and an inert particulate material, wherein the inert particulate material is present in the outer shell in an amount higher than 75% by weight based on the weight of the outer shell; and an inner core having a mixture of inert particulate material and polymer, wherein the polymer is present in the inner core in an amount higher than 90% by weight based on the weight of the inner core. These polymer particles are granular and free-flowing upon exiting the reactor and are produced by a fluidized bed polymerization process at or above the softening point of the sticky polymer. By "free-flowing is meant that the polymer particles flow though openings consistently with little or no assistance of mechanical means (e.g., vibration, shaking, stirring, etc.). That is, the particles it do not bridge or clump.

The polymerizations can be carried out in a single reactor or multiple reactors, typically two or more in series, can also be employed. Preferably a single reactor is employed. The essential parts of the reactor are the vessel, the bed, the gas distribution plate, inlet and outlet piping, at least one compressor, at least one cycle gas cooler, and a product discharge system containing one or more fluidized bed purgers. In the reactor vessel, above the bed, there is a velocity reduction zone, and in the bed a reaction zone.

Generally, all of the above modes of polymerizing are carried out in a gas phase fluidized bed containing a "seed bed" of polymer which is the same or different from the polymer being produced. Preferably, the bed is made up of the same granular polymer that is to be produced in the reactor. All or a portion of the seed bed may be composed of an inert particulate material. Preferably the seed bed does not contain such material.

In the present invention the preferred seed beds can be an olefinic polymer such as, for example, a homo- or co-polymer of ethylene, a homo- or co-polymerr of propylene, an EPDM rubber, polybutadiene, polyisoprene, and the like. The seed bed is preferably the polybutadiene of a previous run. Such seed bed polymers typically have an average particle size between 0.02 and 0.04 inch diameter, containing less than 3% fines. The preferred polyethylene has a density higher than 0.918 g/cc and a melt index of 0.2 to 2.5. The polymer employed as the seed bed can be the same as that being produced if obtained from a previous run. The amount charged is near the planned steady state operating fluidized bed weight. Static is not an operating concern with EPDM. However, it is preferred that the carbon black level be about 25 to 35 lbs of carbon black per 100 lbs EPDM, especially prior to initiating the feeding of the 1,3-butadiene monomer. Addition of such amounts of carbon black to the polymer seed bed prevents the forming sticky elastomer (polybutadiene) from agglomerating the seed bed once polymerization begins.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, butane, isopentane) and, if desired, modifiers (e.g., hydrogen). Thus, during the course of a polymerization, the bed comprises formed polymer particles, growing polymer particles, catalyst particles, and optional flow aids (fluidization aids) fluidized by polymerizing and modifying gaseous components introduced at a flow rate or velocity sufficient to cause the particles to separate and act as a fluid.

In general, the polymerization conditions in the gas phase reactor are such that the temperature can range from sub-atmospheric to super-atmospheric, but is typically from about 0 to 120° C., preferably about 40 to 100° C., and most preferably about 40 to 80° C. Partial pressure will vary depending upon the temperature of the polymerization, and it can range from about 1 to 300 psi (6.89 to 2,067 kiloPascals), preferably 1 to 100 psi (6.89 to 689 kiloPascals). The condensation temperature of butadiene is well known. In general, it is preferred to operate at temperatures slightly above to slightly below (that is, for example, +10° C. for butadiene) the dew point. Preferably, the gas phase process used in conjunction with the inventive method is conducted in a continuous gas phase reactor or a semibatch gas phase reactor in the presence of an inert particulate material under reaction conditions such that at least a portion of the butadiene is maintained at or below its dew point temperature.

Catalysts that are employed in slurry, solution, or bulk polymerizations of higher boiling or readily condensable monomers (e.g., butadiene and isoprene) can be utilized in the invention. The catalysts generally used to produce high cis 1,4-polybutadiene from 1,3-butadiene are compounds of transition metals, such as titanium, cobalt, nickel, uranium and rare-earth metals (e.g., Group IIIB (57–103) such as neodymium) and mixtures thereof, with alkyl halide and/or hydride derivatives of metals of IA, IIA, and IIIA Groups of the Periodic System. These are disclosed in U.S. Pat. Nos. 3,118,864; 3,178,402; 3,794,604; 4,242,232; 4,699,960; 5,453,471; in Belgian Patent Nos. 559,676; 573,680; 791,709; EP Patent Nos. 727,447 and 647,657; WO 96/04322 (PCT/US95 09826 and WO 96/04323 (PCT/US95109827); and JP 58-061107. Preferred catalysts include compounds of cobalt, nickel, and rare earth metals such as neodymium. Most preferred are compounds employing nickel or neodymium. The catalyst can be supported or unsupported. The catalysts can be used in the polymerization process of the invention as a solution, a slurry, an emulsion, or dispersion. The catalyst can be used in spray-dried form with or without the use of filler material. The catalysts can be employed with or without a promoter.

All references cited herein are incorporated by reference.

Whereas the scope of the invention is set forth in the appended claims, the following examples illustrate certain aspects of the present invention. The examples are set forth for illustration and are not to be construed as limitations on the invention except as set forth in the claims. Throughout the specification all parts and percentages are by weight unless otherwise specified.

EXAMPLES

EXAMPLE 1 (COMPARATIVE)

Standard Procedure For Initiating Polybutadiene Polymerization Resulted in a Failed Startup In preparation for reaction, before an initial charge of polymer particles was added to the ractor, a fluidized bed reactor was dried so that only 15 ppmv water was present in the vapor phase. After drying, the reactor was cooled to 80° C., and the initial charge ("seed bed") of polymer was added to the reactor. The polymer was ethylene propylene diene (ENB) rubber with an average particle size approximately 0.03 inches diameter, containing less than 3% fines, having a Mooney viscosity of 70. The amount of polymer charged was near the planned steady-state operating fluidized bed weight.

Carbon black (30 lbs/100 lbs polymer) was added to the ethylene propylene diene rubber seed bed in order to reduce static charge buildup during bed charging and drying procedures and to prevent agglomeration. The addition of carbon black to the polymer seed bed prevents the sticky butadiene rubber polymer particles from agglomerating in the seed bed once polymerization began.

After charging, the carbon black containing seed bed, it was dried so that the measured vapor concentration of water was less than 25 ppmv. This drying was performed at 85° C. to prevent deposition of polymer on the reactor walls.

The reactor and seed bed was then passivated with 3400 ppmw aluminum alkyl (tri-isobutyl aluminum alkyl, abbv. TIBA). The passivation step was necessary so that nearly all of the aluminum alkyl co-catalyst fed to the fluid bed reactor would react with the catalyst when catalyst and monomer feed was initiated, and not with any impurities in the seed bed. Side reactions of the alkyl with impurities could result in by-products which negatively affect catalyst performance. This passivation process was run at 60° C. at 150 psig.

Monomer (1,3-butadiene) was added (20 lb/hr) to reach the desired pressure (65 psig) for reaction. Following the addition of 1,3-butadiene, a neodymium catalyst and di-isobutyl aluminum hydride (DIBAH) were fed at a rate to maintain desired Al/Nd in the product (typically 40:1 to 160:1) and the desired Al concentration (1.4 wt % in the polymer).

The observed induction time before polymerization began was approximately 5.7 hours. This long induction time made startup difficult to control. Nd concentration in the reactor during the induction period reached 150–200 ppm. This high level of residual metal resulted in operational problems and contamination of the product.

EXAMPLE 2

Improved Procedure For Polybutadiene Polymerization Resulted in a Startup with a Short Induction Time In preparation for a reaction, before an initial charge of polymer particles was added to the reactor, a fluidized bed reactor was dried so that only 15 ppmv water was present in the vapor phase. After drying, the reactor was cooled to 80° C., and the initial charge of polymer was added to the reactor. The polymer was ethylene propylene diene (ENB) rubber with an average particle size approximately 0.03 inches diameter, containing less than 3% fines, having a Mooney viscosity of 72. The amount of polymer charged was near the planned steady-state operating fluidized bed weight.

Carbon black (25.2 lbs/100 lbs polymer) was added to polyethylene seed bed in order to reduce static charge buildup during bed charging and drying procedures.

After charging, the carbon black containing seed bed was dried so that the measured vapor concentration of water was less than 25 ppmv. This drying was performed at 85° C. to prevent deposition of polymer on the reactor walls (temperatures higher than 90° C. may cause deposition.

The reactor and seed bed was then passivated with an aluminum alkyl (tri-isobutyl aluminum alkyl or TIBA) using 5460 ppmw. This passivation process was run at 60° C. at 150 psig.

To ensure complete passivation, the mixing time for the aluminum alkyl was 2.5 hours. The reactor was purged at least twice with nitrogen at high pressure (500 psig) to remove any by-products resulting from the alkyl passivation.

After passivation and purging of the seed bed, catalyst and co-catalyst were pre-fed to the reactor at concentrations of 1.8% aluminum alkyl (di-isobutyl aluminum hydride) and 45–60 ppmv Nd metal. 1,3-butadiene was fed to the reactor at 20 lb/hr after the minimum catalyst and co-catalyst levels necessary for reaction had been attained.

During the addition of 1,3-butadiene, catalyst and cocatalyst feed rates were maintained so that the onset of polymerization occurred quickly and in a controllable manner. The flow rate used for the catalyst was 1–3 g Nd per hour. After the reaction had been established, catalyst and co-catalyst feed rates were reduced to desired operating levels, and process variables were adjusted to make the desired product.

Using the improved initiation procedure, the induction time was reduced from 4–7 hours to 22 minutes, allowing for controlled, safe startup.

EXAMPLE 3 (COMPARATIVE)

Improved Procedure For Polyolefin Polymerization Failed without Minimum Passivation of Aluminum Alkyl Example 2 is repeated except that the seed bed and reactor is passivated with less than 2000 ppmw aluminum alkyl (triethylaluminum). Due to the inadequate level of alkyl aluminum passivation, no reaction takes place using this startup procedure.

What is claimed is:

1. A process for starting a polymerization of butadiene to produce polybutadiene in a gas phase reactor having a seed bed of polymer which comprises (i) passivating the reactor and the seed bed by introducing a passivating compound selected from the group consisting of an aluminum alkyl an aluminoxane, a dialkyl zinc, and mixtures thereof having a concentration ranging from about 2,000 to 20,000 ppm based upon the total amount of polymer employed in the seed bed and (ii) feeding a catalyst and co-catalyst to the reactor before the addition of the butadiene.

2. The process of claim 1 wherein the reactor and seed bed are dried down to 10 to 50 ppmv water before the addition of the passivating compound.

3. The process of claim 1 wherein the passivating compound is an aluminum alkyl is represented by the formula $R_3Al$ wherein each R is the same or different and is an alkyl radical having 1 to 14 carbon atoms.

4. The process of claim 3 wherein the passivating compound is an aluminum alkyl that is the same as the co-catalyst employed in the polymerization.

5. The process of claim 2 wherein the passivating compound is an aluminoxane.

6. The process of claim 1 wherein the passivating compound is a dialkylzinc compound having the formula ZnRR' wherein each R and R' are the same or different alkyl radical having from 1 to 14 carbon atoms.

7. The process of claim 6 wherein the dialkylzinc compound is diethylzinc.

8. The process of claim 1 wherein the polymerization is conducted in the presence of a catalyst containing a metal selected from the group consisting of titanium, cobalt, nickel, a rare-earth, and mixtures thereof.

* * * * *